United States Patent
Ban et al.

(10) Patent No.: US 8,865,260 B2
(45) Date of Patent: Oct. 21, 2014

(54) METHOD OF MAKING A COATED CERAMIC CUTTING INSERT

(71) Applicant: Kennametal Inc., Latrobe, PA (US)

(72) Inventors: Zhigang Ban, Latrobe, PA (US); Alfred S. Gates, Jr., Greensburg, PA (US); Yixiong Liu, Greensburg, PA (US); Jie Wu, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 13/908,085

(22) Filed: Jun. 3, 2013

(65) Prior Publication Data

US 2013/0260035 A1   Oct. 3, 2013

Related U.S. Application Data

(60) Division of application No. 12/722,015, filed on Mar. 11, 2010, now Pat. No. 8,475,944, which is a continuation-in-part of application No. 12/057,564, filed on Mar. 28, 2008, now Pat. No. 8,080,323, which is a continuation-in-part of application No. 11/823,679, filed on Jun. 28, 2007, now abandoned.

(51) Int. Cl.
| | |
|---|---|
| C23C 16/00 | (2006.01) |
| C23C 30/00 | (2006.01) |
| C04B 41/89 | (2006.01) |
| B23B 27/14 | (2006.01) |
| C23C 28/04 | (2006.01) |
| C04B 41/00 | (2006.01) |
| C04B 41/52 | (2006.01) |
| C23C 28/00 | (2006.01) |

(52) U.S. Cl.
CPC .......... *B23B 27/148* (2013.01); *B23B 2228/10* (2013.01); *C23C 30/005* (2013.01); *C04B 41/89* (2013.01); *B23B 2226/18* (2013.01); *B23B 2260/144* (2013.01); *B23B 27/141* (2013.01); *C23C 28/044* (2013.01); *C04B 41/009* (2013.01); *C04B 41/52* (2013.01); *C23C 28/42* (2013.01)

USPC .................................. 427/255.31; 427/255.34

(58) Field of Classification Search
None
See application file for complete search history.

(56) References Cited

U.S. PATENT DOCUMENTS

| | | | |
|---|---|---|---|
| 4,880,755 A | 11/1989 | Mehrotra et al. | |
| 5,372,873 A | 12/1994 | Yoshimura et al. | |

(Continued)

FOREIGN PATENT DOCUMENTS

| | | | |
|---|---|---|---|
| CN | 1721107 A | 1/2006 | |
| CN | 1905972 A | 1/2007 | |

(Continued)

OTHER PUBLICATIONS

Evidenciary: Particle size conversion Chart, downloaded Oct. 2013.*

(Continued)

*Primary Examiner* — Joseph Miller, Jr.
(74) *Attorney, Agent, or Firm* — Matthew W. Gordon, Esq.

(57) ABSTRACT

A coated ceramic cutting insert for removing material from a workpiece, as well as a method for making the same, that includes a ceramic substrate with a rake surface and at least one flank surface wherein a cutting edge is at the juncture therebetween. A wear-resistant coating scheme that includes an alumina-containing base coating layer region, which has at least one exposed alumina coating layer, deposited by chemical vapor deposition on the substantially all of the surfaces of the ceramic substrate that experience wear during removal of material from the workpiece. The exposed alumina coating layer exhibits a blasted stress condition ranging between about 50 MPa (tensile stress) and about −2 GPa (compressive) as measured by XRD using the Psi tilt method and the (024) reflection of alumina. The exposed alumina coating layer is the result of wet blasting a titanium-containing outer coating layer region from the surface of the alumina-containing base coating layer region.

8 Claims, 4 Drawing Sheets

(56) References Cited

U.S. PATENT DOCUMENTS

| | | | |
|---|---|---|---|
| 5,374,471 | A | 12/1994 | Yoshimura et al. |
| 5,487,625 | A | 1/1996 | Ljungberg et al. |
| 5,503,913 | A | 4/1996 | Konig et al. |
| 5,525,134 | A | 6/1996 | Mehrotra et al. |
| 5,635,247 | A | 6/1997 | Ruppi |
| 5,861,210 | A | 1/1999 | Lenander et al. |
| 5,863,640 | A | 1/1999 | Ljungberg et al. |
| 6,090,476 | A | 7/2000 | Thysell et al. |
| 6,737,178 | B2 | 5/2004 | Ota et al. |
| 6,884,496 | B2 | 4/2005 | Westphal et al. |
| 7,232,603 | B2 | 6/2007 | Hessman |
| 7,393,263 | B2 | 7/2008 | Okada et al. |
| 7,455,918 | B2 | 11/2008 | Gates, Jr. et al. |
| 7,476,063 | B2 | 1/2009 | Wickman et al. |
| 7,476,437 | B2 | 1/2009 | Jonsson |
| 7,531,213 | B2 | 5/2009 | Bjormander |
| 7,544,024 | B2 | 6/2009 | Omori et al. |
| 7,691,496 | B2 | 4/2010 | Park et al. |
| 7,803,464 | B2 | 9/2010 | Okada et al. |
| 7,951,737 | B2 | 5/2011 | Nakayama et al. |
| 7,968,182 | B2 | 6/2011 | Trinh et al. |
| 7,985,471 | B2 | 7/2011 | Zackrisson et al. |
| 8,133,576 | B2 | 3/2012 | Omori et al. |
| 2003/0104254 | A1 | 6/2003 | Westphal et al. |
| 2005/0123366 | A1 | 6/2005 | Goudemond et al. |
| 2006/0127671 | A1 | 6/2006 | Park et al. |
| 2006/0204757 | A1 | 9/2006 | Ljungberg |
| 2006/0257690 | A1 | 11/2006 | Bjormander |
| 2007/0009763 | A1 | 1/2007 | Littecke et al. |
| 2007/0298230 | A1 | 12/2007 | Omori et al. |
| 2007/0298281 | A1 | 12/2007 | Andersson et al. |
| 2007/0298282 | A1 | 12/2007 | Andersson et al. |
| 2008/0107882 | A1 | 5/2008 | Littecke et al. |
| 2009/0004440 | A1 | 1/2009 | Ban et al. |
| 2009/0004449 | A1 | 1/2009 | Ban et al. |
| 2010/0255345 | A1 | 10/2010 | Ban et al. |
| 2011/0064530 | A1 | 3/2011 | Ban et al. |

FOREIGN PATENT DOCUMENTS

| | | |
|---|---|---|
| CN | 101090789 A | 12/2007 |
| EP | 1717348 A2 | 2/2006 |
| EP | 1911538 A1 | 4/2008 |
| JP | 06055311 | 1/1994 |

OTHER PUBLICATIONS

Moltrecht, "Machine Shop Practice, Second Edition", vol. 1, Industrial Press Inc., New York, New York (1981) pp. 199-204.

Merchant, "Principles of Metal Cutting and Machinability", Section 17, Tool Engineer's Handbook, (1949) pp. 302-315.

American National Standard, ANSI B212.4-2002 For Cutting Tools—Indexable Inserts—Identification System, Sponsor Cemented Carbide Producer's Association (2002).

PCT Application No. PCT/US2011/025165 Notification of Transmittal of the International Search Report and Written Opinion mailed Oct. 25, 2011 (2 pages).

PCT Application No. PCT/US2011/025165 International Search Report mailed Oct. 25, 2011. (4 pages).

PCT Application No. PCT/US2011/025165 Written Opinion mailed Oct. 25, 2011. (4 pages).

Great Britain Application No. GB1216065.1 Official Report dated Mar. 27, 2014 (4 pages).

German Patent Application No. 11 2011 100 870.8 Official Action dated Feb. 10, 2014 and English translation (12 pages).

K-2699USCN1 China Office Action dated May 27, 2014 with China Search Report.

\* cited by examiner

ψ = TILT ANGLE

φ = ROTATION ANGLE

σ₁ σ₂ = PRINCIPAL STRESSES

σ_φ = STRESS AT ROTATION ANGLE φ

US 8,865,260 B2

1

METHOD OF MAKING A COATED CERAMIC CUTTING INSERT

CROSS-REFERENCE TO EARLIER CO-PENDING PATENT APPLICATION

This patent application is a divisional patent application of earlier filed and co-pending U.S. patent application Ser. No. 12/722,015 filed Mar. 11, 2010 for COATED CERAMIC CUTTING INSERT AND METHOD FOR MAKING THE SAME by Zhigang Ban et al., which is a continuation-in-part of earlier filed U.S. patent application Ser. No. 12/057,564 filed Mar. 28, 2008 by Zhigang Ban, Mark J. Rowe, Yixiong Liu, Alfred S. Gates, Jr., Kent P. Mizgalski and Mark S. Greenfield for a CUTTING INSERT WITH A WEAR-RESISTANT COATING SCHEME EXHIBITING WEAR INDICATION AND METHOD OF MAKING THE SAME (now U.S. Pat. No. 8,080,323), which is a continuation-in-part of earlier-filed U.S. patent application Ser. No. 11/823,679 filed on Jun. 28, 2007 by Zhigang Ban, Mark J. Rowe, Yixiong Liu, and Alfred S. Gates, Jr. for a CUTTING INSERT WITH A WEAR-RESISTANT COATING SCHEME EXHIBITING WEAR INDICATION AND METHOD OF MAKING THE SAME (now abandoned). Applicants herein (Zhigang Ban, Alfred S. Gates, Jr. Yixiong Liu, and Jie Wu) claim under the United States Patent Statute (Title 35, United States Code) including 35 U.S.C. §120 the benefit of the filing date of each one of such earlier patent applications (Ser. No. 11/823,679 and Ser. No. 12/057,564 and Ser. No. 12/722,015).

Further, applicants hereby incorporate by reference herein the entirety of each one of the above-mentioned United States patent applications, i.e., U.S. patent application Ser. No. 11/823,679 [filed Jun. 28, 2007] and U.S. patent application Ser. No. 12/057,564 [filed Mar. 28, 2008] and U.S. patent application Ser. No. 12/722,015 [filed Mar. 11, 2010].

BACKGROUND OF THE INVENTION

The present invention pertains to a ceramic cutting insert useful for the removal of material from a workpiece, e.g., chipforming machining of a workpiece. More specifically, the present invention pertains to a ceramic cutting insert useful for the removal of material from a workpiece, e.g., chipforming machining of a workpiece, wherein the ceramic cutting insert, which comprises a silicon nitride-based substrate or a SiAlON (silicon aluminum oxynitride)-based substrate, has a coating scheme thereon. The coating scheme includes an exposed alumina coating layer exhibiting a compressive stress.

Heretofore, artisans have used ceramic cutting inserts for the removal of material from a workpiece, e.g., chipforming machining of a workpiece. Patent documents provide some examples of these ceramic cutting inserts. Exemplary ceramics may comprise silicon nitride-based ceramics and SiAlON-based ceramics.

For example, U.S. Pat. No. 5,525,134 to Mehrotra et al. (assigned to Kennametal Inc.) discloses the use of a silicon nitride-based ceramic cutting insert. The silicon nitride-based ceramic cutting insert comprises at least about 85 volume percent beta silicon nitride and less than about 5 volume percent intergranular phase. Other additives include yttria and magnesia. The silicon nitride-based ceramic cutting insert may have a refractory coating thereon such as, for example, one or more of alumina, titanium carbide or titanium nitride.

2

U.S. Pat. No. 4,880,755 to Mehrotra et al. (assigned to Kennametal Inc.) discloses the use of a SiAlON-based ceramic cutting insert. The SiAlON-based ceramic cutting insert has a surface layer with an increased aluminum and oxygen content as compared to the bulk region. The process to make this cutting insert comprises the steps of preparing a SiAlON core composition, which may comprise alpha-prime-SiAlON and beta-prime SiAlON along with an intergranular phase. Next, the process comprises coating the SiAlON core with an alumina coating via CVD (chemical vapor deposition). Finally, the process comprises heat treating the SiAlON-alumina coating composite until a portion of the alumina diffuses into the SiAlON core. The SiAlON-based ceramic cutting insert, which has the alumina layer, may further include a refractory coating layer (e.g., carbides, nitrides, carbonitrides, oxides and mixtures thereof of vanadium, titanium, tantalum, niobium, hafnium or zirconium) over the alumina layer.

A coating scheme (i.e., coating layer(s)) applied via CVD to a cobalt cemented tungsten carbide substrate exhibits a tensile stress. The presence of the tensile stress is detrimental to the adhesion of the CVD coating scheme. Heretofore, some have used a post-coating blasting treatment to reduce the tensile stresses in the coating scheme or to change the stress to compressive stress in the coating scheme. As one example, U.S. Pat. No. 5,372,873 to Yoshimura et al. (assigned to Mitsubishi Materials Corporation) discloses shot peening the coating scheme on selected surfaces wherein the substrate is a cobalt cemented tungsten carbide, which exhibits a surface layer of cobalt enrichment. The result of shot peening is a change in the stress condition of the coating. In this regard, this patent shows that the shot peening process may be applied locally to parts of the cutting tool, for example to the rake surfaces, so that the residual tensile stresses in the primary coating thereon are lower than those tensile residual stresses in the primary coating on the flank surfaces of the cutting tool. Further, this patent also shows a shot peening treatment applied so that the residual stresses in the primary coating of the rake surfaces of the cutting tool are compressive, and that the residual stresses in the primary coating of the flank surfaces are tensile. As another example, U.S. Pat. No. 5,374,471 to Yoshimura et al. (assigned to Mitsubishi Materials Corporation) discloses shot peening a coating layer on a substrate wherein the shot peening is effective to treat only on the rake surfaces. The substrate is a cobalt cemented tungsten carbide, which exhibits a surface layer of cobalt enrichment.

A coating scheme (i.e., coating layer(s)) applied via CVD to a cermet substrate exhibits a tensile stress. United States Patent Application Publication No. US2006/0127671 A1 to Park et al. discloses the use of wet blasting as a post-coating treatment of a coating on a cemented carbide substrate, as well as cermet substrate. The wet blasting process uses a alumina particle, which have a size between 10-300 μm, water slurry. There is a reduction in the tensile stress or a conversion to compressive stress in the outer coating layer due to the wet blasting. Specific coating schemes include an alumina coating with titanium carbide/titanium nitride layer(s) on top of the alumina layer.

Another consequence of a post-coating treatment such as wet blasting is a smoothening of the coating surface. United States Patent Application Publication No. US2006/0204757 A1 to Ljungberg discloses a two-step wet blasting post-coating treatment for a coating scheme comprising a $TiC_xN_y$ coating layer and an $\alpha$-$Al_2O_3$ coating layer. The substrate is a cobalt cemented tungsten carbide material. These treatments show the affect due to variations in impingement angle and pressure. This treatment results in a smoother coating surface and a reduction in tensile stress or a conversion to compressive stress. U.S. Pat. No. 5,861,210 to Lenander et al., which discloses a Ti $C_xN_yO_z$ layer on alumina (see Col. 2, lines 30-43), discloses that it is known to vary the blasting parameters (see Example 1, Col. 4, line 48 through Col. 5, line 11) to achieve different results.

United States Patent Application Publication No. US2007/0009763 A1 to Littecke et al. discloses a wet blasting post-coating treatment for a coating scheme comprising a $TiC_xN_y$ coating layer and an $\alpha$-$Al_2O_3$ coating layer. The substrate is a cobalt cemented tungsten carbide material. This treatment results in a smoother coating surface and a low tensile stress $TiC_xN_y$ coating layer and a smooth $\alpha$-$Al_2O_3$ coating layer.

Each one of United States Patent Application Publication No. US2007/0298281 A1 to Andersson et al. and United States Patent Application Publication No. US2007/0298282 A1 to Andersson et al. discloses a wet blasting post-coating treatment for a coating scheme comprising a $TiC_xN_y$ coating layer and an $\alpha$-$Al_2O_3$ coating layer. The substrate is a cobalt cemented tungsten carbide material. This treatment results in a low tensile stress $TiC_xN_y$ coating layer and a smooth $\alpha$-$Al_2O_3$ coating layer. The stress condition is different between the rake surface and the flank surface.

In addition to wet blasting, some have used dry blasting to reduce the tensile stress in the coating. For example, U.S. Pat. No. 6,884,496 to Westphal et al. discloses the basic benefits of dry blasting a coated cutting insert wherein there is an increase in the compressive stress. See Col. 2, lines 42-67.

There should be an appreciation that some of the blasting operations remove only a small portion of the coating layer. For example, U.S. Pat. No. 7,531,213 to Bjormander pertains to a coated cutting tool insert wherein the post-treatment (preferably blasting or brushing) removes the outermost coating layer only on the edge-line and on the rake face.

Some of the above patent documents show a cutting insert useful for the removal of material from a workpiece, e.g., chipforming machining of a workpiece, wherein the coating scheme has been subjected to a post-coating treatment. This post-coating treatment has resulted in a reduction of the tensile stress or a conversion of the stress to compressive stress in the coating layer(s). This post-coating treatment has resulted in a smoothening of the outer coating layer.

However, many of these patent documents show a cutting insert, which possesses a cemented carbide substrate or in one case, a cermet substrate. These patent documents do not disclose the actual implementation of a post-coating treatment on a silicon nitride-based substrate or SiAlON-based substrate resulting in a reduction of the tensile stress or a conversion of the stress to compressive stress in the coating layer(s), as well as a smoothening of the outer coating layer.

In addition, some of these patent documents show the removal of only a portion of the outer coating layer. These patent documents do not disclose the actual implementation of a post-coating treatment on a silicon nitride-based substrate or SiAlON-based substrate leading to the complete removal of an outer coating layer. The result of the complete removal of the outer coating layer is a reduction of the tensile stress or a conversion of the stress to compressive stress in the coating layer(s) including the coating layer remaining as the outer coating layer.

SUMMARY OF THE INVENTION

In one form thereof, the invention is a coated ceramic cutting insert for removing material from a workpiece. The coated ceramic cutting insert includes a ceramic substrate selected from the group of silicon nitride-based ceramics and silicon aluminum oxynitride-based ceramics. The substrate has a rake surface and at least one flank surface wherein a cutting edge is at the juncture between the rake surface and the flank surface. The coated ceramic cutting insert further includes a wear-resistant coating scheme that includes an alumina-containing base coating layer region deposited by chemical vapor deposition on substantially all of the surfaces of the ceramic substrate that experience wear during removal of material from the workpiece. The alumina-containing base layer region has at least one exposed alumina coating layer. The exposed alumina coating layer exhibits a blasted stress condition ranging between about 50 MPa (tensile stress) and about −2 GPa (compressive stress) as measured by XRD using the Psi tilt method and the (024) reflection of alumina.

In another form thereof, the invention is a method of making a coated ceramic cutting insert comprising the steps of: providing a ceramic substrate wherein the ceramic substrate being selected from the group consisting of silicon nitride-based ceramics and silicon aluminum oxynitride-based ceramics, the ceramic substrate having a rake surface and at least one flank surface, and a cutting edge formed at the juncture between the rake surface and the flank surface; forming a pre-blast coated member comprising the ceramic substrate and a pre-blasted coating scheme, and wherein the pre-blasted coating scheme is deposited by the following steps: depositing on the surface of the ceramic substrate by chemical vapor deposition an alumina-containing base coating layer region, and the alumina-containing base coating layer region comprising at least one outermost alumina coating layer; depositing on the alumina-containing base coating layer region by chemical vapor deposition a titanium-containing outer coating layer region comprising at least one titanium-based coating layer; and wet blasting off the titanium-containing outer coating layer region thereby exposing the outermost alumina coating layer to form an exposed alumina coating layer and changing the stress condition of the exposed outermost alumina coating layer from an initial stress condition ranging between about 50 MPa (tensile stress) and about 800 MPa (tensile stress) as measured by as measured by XRD using the Psi tilt method and the (024) reflection of alumina to a blasted stress condition ranging between about 50 MPa (tensile stress) and about −2 GPa (compressive stress) as measured by XRD using the Psi tilt method and the (024) reflection of alumina.

BRIEF DESCRIPTION OF THE DRAWINGS

The following is a brief description of the drawings that form a part of this patent application.

DETAILED DESCRIPTION

Figure 1:
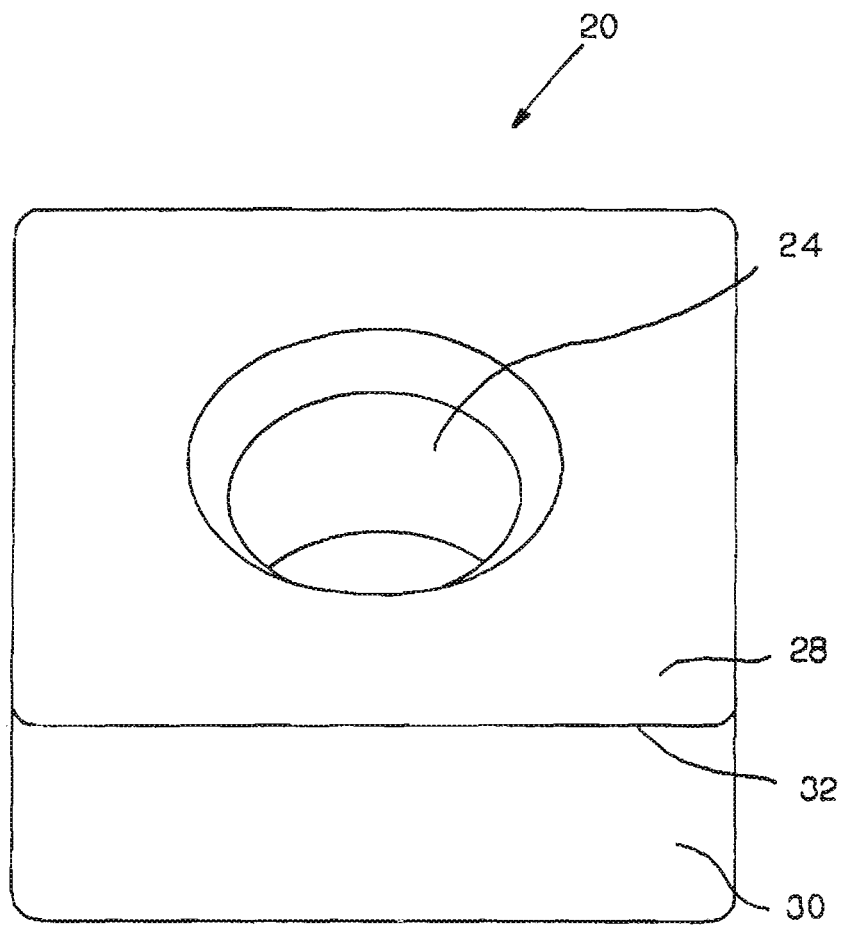
FIG. 1 is an isometric view of a specific embodiment of the coated ceramic cutting insert of the invention wherein the coated ceramic cutting insert is in a post-blasted condition.

Referring to the drawings, FIG. 1 shows a specific embodiment of a coated ceramic cutting insert, which is generally designated as 20, useful for the removal of material from a workpiece, e.g., chipforming machining of a workpiece. In reference to the chipforming machining operation, material removal operations generate chips of the workpiece material. Publications that pertain to machining establish this fact. For example, the book *Machine Shop Practice* [Industrial Press Inc., New York, N.Y. (1981)] by Moltrecht, presents at pages 199-204 a description, inter alia, of chip formation, as well as different kinds of chips (i.e., continuous chip, discontinuous chip, segmental chip). Moltrecht reads [in part] at pages 199-200:

When the cutting tool first makes contact with the metal, it compresses the metal ahead of the cutting edge. As the tool advances, the metal ahead of the cutting edge is stressed to the point where it will shear internally, causing the grains of the metal to deform and to flow plastically along a plane called the shear plane . . . . When the type of metal being cut is ductile, such as steel, the chip will come off in a continuous ribbon . . . .

Moltrecht goes on to describe formation of a discontinuous chip and a segmented chip. As another example, the text found at pages 302-315 of the *ASTE Tool Engineers Handbook*, McGraw Hill Book Co., New York, N.Y. (1949) provides a lengthy description of chip formation in the metal cutting process. At page 303, the ASTE Handbook makes the clear connection between chip formation and machining operations such as turning, milling and drilling.

Figure 2:
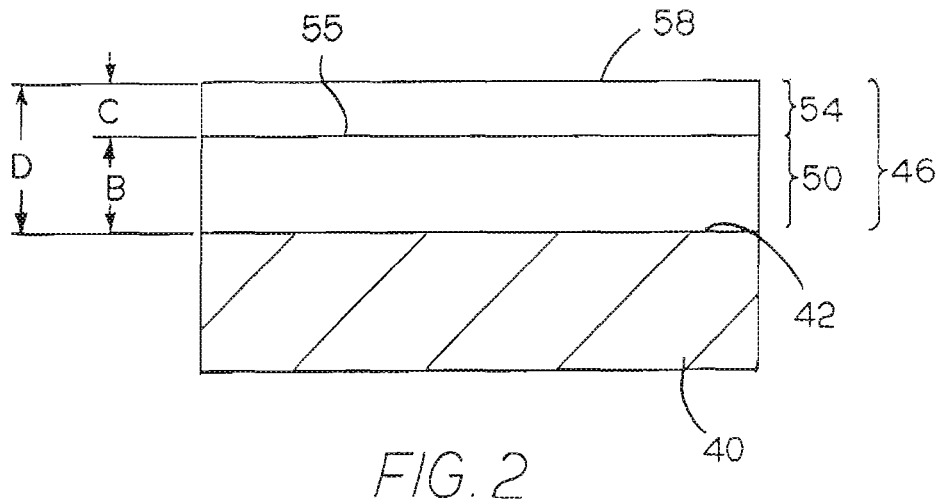
FIG. 2 is a cross-sectional view of the upper region of a coated ceramic cutting insert like that of FIG. 1, but in a pre-blasted condition wherein the ceramic substrate has deposited via chemical vapor deposition thereon the following coating regions: an alumina-containing base coating layer region, and a titanium-containing outer coating layer region on the alumina-containing base coating layer region.

The coated ceramic cutting insert 20 presents a geometry of SNGA433T0820 per the ANSI Standard B-212.4-2002 entitled "American National Standards for Cutting Tools— Indexable Inserts—Identification System". There should be an appreciation that the scope of the invention is not limited to the specific embodiment of ceramic cutting insert 20 or the specific geometry of the ceramic cutting insert 20. The claims define the scope of the invention and applicants do not intend to restrict the scope of the invention by the specific embodiment. The coated ceramic cutting insert 20 has a rake surface 28 and at least one flank surface 30. A cutting edge 32 is at the juncture between the rake surface 28 and the flank surface 30. The coated ceramic cutting insert 20 further contains a central aperture 24, which assists the connection of the coated ceramic cutting insert 20 to the cutting tool holder. The coated ceramic cutting insert 20 includes a substrate, which FIG. 1 does not illustrate because the coating scheme covers the ceramic substrate. There should be an appreciation that there may be embodiments in which the coating does not cover the entire surface of the substrate. Cross-sectional views such as, for example, FIG. 2, show a substrate 40.

Referring to the composition of the ceramic substrate (40 in FIG. 2), the ceramic substrate may comprise either silicon nitride-based ceramic or a SiAlON-based ceramic. One specific composition of silicon nitride-based ceramic material suitable for use as the ceramic substrate has a composition of between about 98 weight percent and about 100 weight percent beta-silicon nitride, i.e., the beta phase of silicon nitride. To the extent other components are suitable for the silicon nitride-based ceramic substrate, they comprise glassy or crystalline intergranular phase(s) and metallic phase(s). For example, the crystalline intergranular phase(s) may comprise any one or more of the following $Yb_4SiAlO_8N$, YbAG, $Y_2Si_3O_3O_4$, Y—Hf—O, Mg—Si—O, and the metallic phase(s) may comprise any one or more of the following Si and Fe. A preferred composition for the silicon nitride-based ceramic substrate comprises 98 weight percent beta-silicon nitride with the balance comprising 2 weight percent metallic phases wherein these metallic phases comprise Si and Fe.

In a broader compositional range, the silicon nitride-based ceramic substrate has a composition of between about 96 weight percent and about 100 weight percent beta-silicon nitride, i.e., the beta phase of silicon nitride. To the extent other components are suitable for the silicon nitride-based ceramic substrate of the broader compositional range, they comprise glassy or crystalline intergranular phase such as set forth above, and metallic phase(s) such as set forth above. In still another compositional range, the silicon nitride-based ceramic substrate has a composition of between about 94 weight percent and about 100 weight percent beta-silicon nitride, i.e., the beta phase of silicon nitride, with the possibility of other components of the silicon nitride-based ceramic as set forth above. In yet another compositional range, the silicon nitride-based ceramic substrate has a composition of between about 90 weight percent and about 100 weight percent beta-silicon nitride, i.e., the beta phase of silicon nitride, with the possibility of other components of the silicon nitride-based ceramic as set forth above.

One specific composition of SiAlON suitable for use as the ceramic substrate is an alpha-beta SiAlON ceramic material wherein the alpha-SiAlON phase comprises between greater than about 0 weight percent and about 60 weight percent of the ceramic substrate, and the beta-SiAlON phase comprises between about 40 weight percent and less than about 100 weight percent of the SiAlON ceramic substrate. Applicants contemplate that in some compositions of the alpha-beta SiAlON, intergranular phases will exist wherein these phases could comprise the group YAG, N-YAM, Y—N-alpha-wollstonite, B-phase, N-apatite, N-melilite and glass. A preferred composition of the SiAlON-based ceramic substrate comprises the alpha-SiAlON phase comprises about 18 weight percent of the ceramic substrate, and the beta-SiAlON phase comprises about 82 weight percent of the SiAlON ceramic substrate.

In one compositional range, the silicon aluminum oxynitride-based ceramic substrate is an alpha-beta SiAlON ceramic material wherein the alpha-SiAlON phase comprises between about 25 weight percent and about 45 weight percent of the ceramic substrate, and the beta-SiAlON phase comprises between about 75 weight percent and about 55 weight percent of the SiAlON ceramic substrate. In another compositional range, the silicon aluminum oxynitride-based ceramic substrate is an alpha-beta SiAlON ceramic material wherein the alpha-SiAlON phase comprises between about 25 weight percent and about 40 weight percent of the ceramic substrate, and the beta-SiAlON phase comprises between about 60 weight percent and about 75 weight percent of the SiAlON ceramic substrate. In still another compositional range, the silicon aluminum oxynitride-based ceramic substrate is an alpha-beta SiAlON ceramic material wherein the alpha-SiAlON phase comprises between about 10 weight percent and about 22 weight percent of the ceramic substrate, and the beta-SiAlON phase comprises between about 90 weight percent and about 78 weight percent of the SiAlON ceramic substrate. For all of the above SiAlON-based compositions, applicants contemplate that in some compositions of the alpha-beta SiAlON ceramic the above-mentioned intergranular phases may exist.

In reference to the determination of the composition of the silicon nitride-based ceramic or a SiAlON-based ceramic, the technique to determine the weight percent of the components is X-ray diffraction. For the specific examples set forth herein, the parameters for the X-ray diffraction technique is based upon Rietveld quantitative analysis. The Rietveld refinement method requires the x-ray powder diffraction data be in fixed optics format. If the powder diffraction data was collected using programmable optics, the data must first be converted to fixed optics data. The fixed optics data is corrected for any known sample displacement. Crystal structure data is input for each of the crystalline phases present in the specimen. Rietveld refinement is completed using the input structure data. Typical Rietveld refinement parameters settings are:

| | |
|---|---|
| Background calculation method | Polynomial |
| Sample Geometry | Flat Plate |
| Linear Absorption Coefficient | Calculated from average specimen composition |
| Weighting Scheme | Against Iobs |
| Profile Function | Pseudo-Voight |
| Profile Base Width | 8.0 |
| Least Squares Type | Newton-Raphson |
| Polarization Coefficient | 1.0 |

All Rietveld phase analysis results are reported in weight percent values. If there are crystal phases present in the ceramic substrate for which no crystal structure data exists, a simple peak height ratio is measured. For these peak height ratios, a background profile is fit to the collected data. The most intense peak of the crystal phase is determined and a profile peak height is measured. A profile peak height is determined for the most intense peak of the powder diffraction pattern. A relative peak ratio (RI) is determined for the crystal phase using the following formula:

$$\left(\frac{\text{Height(phase)}}{\text{Height(max)}}\right) \times 100$$

As mentioned herein above and referring to FIG. 3A and FIG. 3B, the coated ceramic cutting insert comprises a ceramic substrate 40 with a post-blasted coating scheme (50, 82) thereon. The post-blasted coating scheme is the result of wet blasting a pre-blasted coating scheme 46 (see FIG. 2) on the ceramic substrate 40. FIG. 2 illustrates the general coating architecture of the pre-blasted coating scheme 46. As will become apparent in reference to FIG. 2A and FIG. 2B, alternative coating architectures exist for a part of the pre-blasted coating scheme 46.

Referring to the pre-blasted coating scheme 46 of FIG. 2, the pre-blasted coating scheme 46 comprises an alumina-containing base coating layer region 50 deposited by chemical vapor deposition on the surface 42 of the ceramic substrate 40. The alumina-containing base coating layer region 50 can be on the entire surface of the ceramic substrate. In the alternative, the alumina-containing base coating layer region 50 can be on substantially all of those areas of the surface of the substrate that experience wear during the removal of material from the workpiece. Typically, such wear occurs at the cutting edge and on the rake face near the cutting edge and on the flank surface(s) near the cutting edge. The alumina-containing base coating layer region 50 comprises at least one outermost (i.e., the coating layer farthest away from the surface of the ceramic substrate) alumina coating layer wherein this outermost alumina coating layer may comprise alpha-alumina, i.e., the alpha crystalline phase of alumina. However, there should be an understanding that the outermost alumina coating layer may, in the alternative, comprise other crystalline phases of alumina such as, for example, kappa-alumina only or a mixture of kappa-alumina and alpha-alumina, as well as other crystalline phase of alumina.

Referring to FIG. 2, the thickness of the alumina containing base coating layer region 50 is thickness "B". Thickness "B" of the alumina containing base coating layer region 50 can range in one alternative between about 2 micrometers (μm) and about 25 micrometers (μm). Another alternative of the thickness "B" comprises between about 2 micrometers (μm) and about 15 micrometers (μm). Still another alternative of the thickness "B" comprises between about 4 micrometers (μm) and about 12 micrometers (μm).

The pre-blasted coating scheme 46 of FIG. 2 further comprises a titanium-containing outer coating layer region 54, which is on the surface 55 of the alumina base coating layer region 50. The titanium-containing outer coating layer region 54 comprises one or more of coating layers of titanium nitride and/or titanium carbonitride applied on the alumina containing base coating layer region 50 by chemical vapor deposition. The titanium-containing outer coating region 54 has an outer surface 58. The thickness of the titanium-containing outer coating layer region 54 is thickness "C". Thickness "C" of the titanium-based outer coating layer region 54 can range in one alternative between about 0.5 micrometers (μm) and about 5 micrometers (μm). Another alternative range of the thickness "C" comprises between about 0.5 micrometers (μm) and about 3 micrometers (μm). Yet, another alternative range of the thickness "C" comprises between about 0.5 micrometers (μm) and about 1.5 micrometers (μm).

The overall coating thickness for the pre-blasted coating scheme 46 is thickness "D". Thickness "D" of the pre-blasted coating scheme can range in one alternative between about 2.5 micrometers (μm) and about 30 micrometers (μm). Another alternative range of the thickness "D" comprises between about 2.5 micrometers (μm) and about 18 micrometers (μm). Still another alternative range of the thickness "D" comprises between about 4.5 micrometers (μm) and about 13.5 micrometers (μm).

Figure 2A:
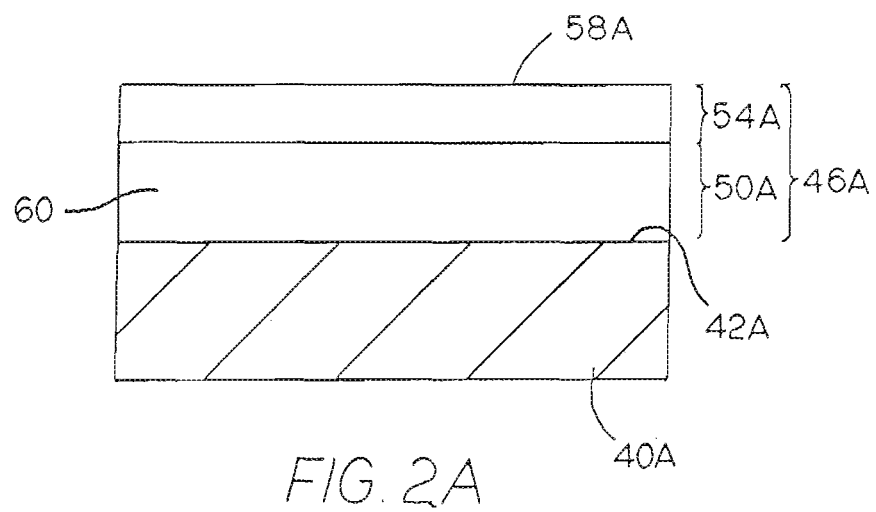
FIG. 2A is a cross-sectional view of the upper region of a coated ceramic cutting insert like that of FIG. 1 wherein the alumina-containing base coating layer region is illustrated as comprising a single (or outermost) alumina coating layer.

Referring back to the alumina-containing base layer region 50, this region 50 may present a plurality of alternatives for the coating architecture. FIG. 2A illustrates one such alternative for the alumina-containing base layer region 50A. In FIG. 2A, the alumina-containing base layer region 50A consists substantially of the outermost alumina coating layer 60, which is on the surface 42A of the ceramic substrate 40A. In other words, the entire alumina-containing base layer region 50A comprises one outermost alumina coating layer 60. The pre-blasted coating scheme 46A further includes the titanium-containing outer coating layer region 54A, which has an outer surface 58A.

Figure 2B:
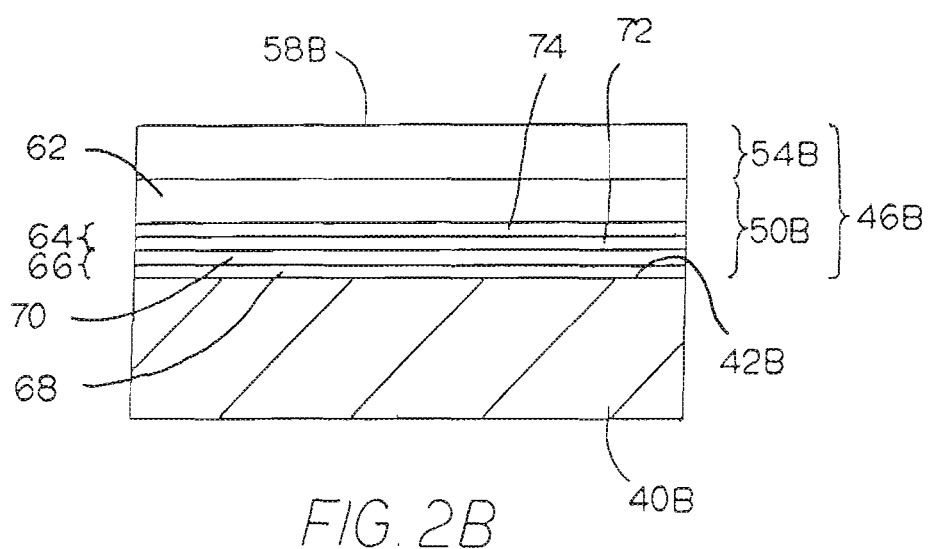
FIG. 2B is a cross-sectional of the upper region of a coated ceramic cutting insert like that of FIG. 1 wherein the alumina-containing base coating layer region is illustrated as having two coating sets and an outermost alumina coating layer.
Figure 4:
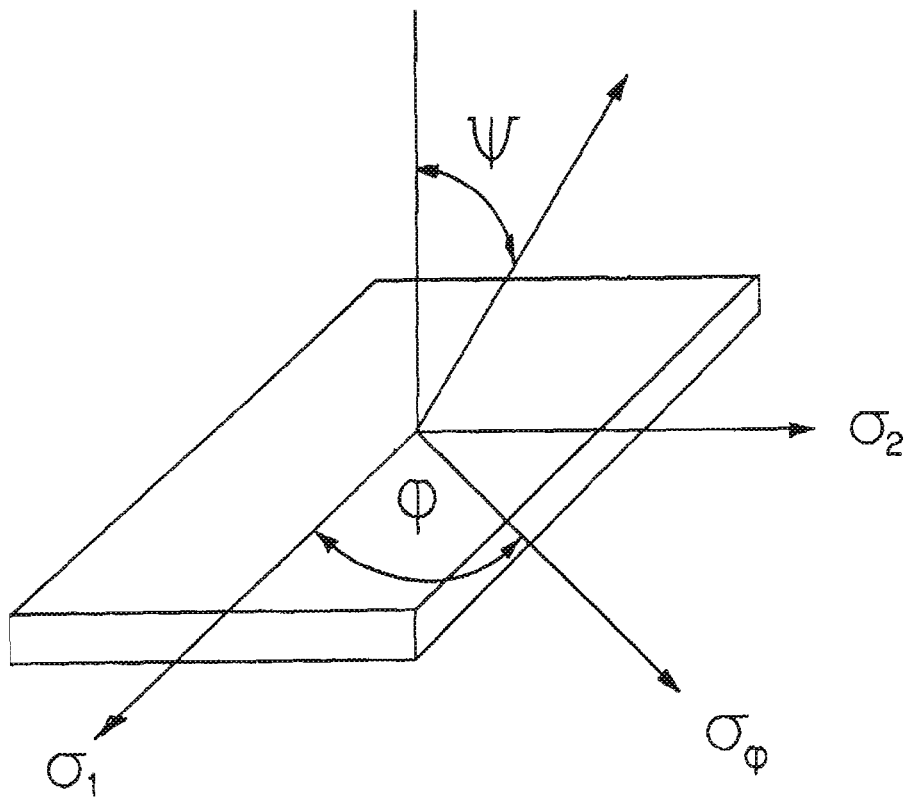
FIG. 4 is a drawing that shows the relationships between the various tilt and rotation angles in the measurement of the stress condition in the coating layers via an x-ray diffraction (XRD) technique based on the Psi tilt method.

FIG. 2B illustrates another alternative for the alumina-containing base layer region 50. FIG. 2B illustrates that the alumina-containing base layer region 50B comprises a plurality of coating sets (64, 66) and the outermost alumina coating layer 62. In this alternative, coating set 64 may comprise an alumina coating layer 74 and a titanium oxycarbonitride coating layer 72, and coating set 66 may comprise an alumina coating layer 70 and a titanium oxycarbonitride coating layer 68. The titanium oxycarbonitride coating layer 68 is on the surface 42B of the substrate 40B. The pre-blasted coating scheme 46B further includes a titanium-containing outer coating layer region 54B, which has an outer surface 58B.

The thickness of the alumina coating layer (70, 74) can range in one alternative between about 0.1 micrometers (μm) and about 3 micrometers (μm). Another alternative range of the thickness of the alumina coating layer (70, 74) comprises between about 0.2 micrometers (μm) and about 2 micrometers (μm). Yet, another alternative range of the thickness of the alumina coating layer (70, 74) comprises between about 0.5 micrometers (μm) and about 1 micrometers (μm). The thickness of the titanium oxycarbonitride coating layer (68, 72) can range in one alternative between about 0.1 micrometers (μm) and about 2 micrometers (μm). Another alternative range of the thickness of the titanium oxycarbonitride coating layer (68, 72) comprises between about 0.2 micrometers (μm) and about 1 micrometers (μm). Yet, another alternative range of the thickness of the titanium oxycarbonitride coating layer (68, 72) comprises between about 0.2 micrometers (μm) and about 0.5 micrometers (μm).

The thickness of the combination of the alumina coating layer (70, 74) and the titanium oxycarbonitride coating layer (68, 72) can range in one alternative between about 0.2 micrometers (μm) and about 5 micrometers (μm). Another alternative range of the thickness of the combination of the alumina coating layer (70, 74) and the titanium oxycarbonitride coating layer (68, 72) can range in one alternative between about 0.2 micrometers (μm) and about 3 micrometers (μm). Yet, another alternative range of the thickness of the combination of the alumina coating layer (70, 74) and the titanium oxycarbonitride coating layer (68, 72) can range in one alternative between about 0.2 micrometers (μm) and about 2 micrometers (μm).

Applicants contemplate that other coating layers, whether it is the coating layer architecture or the composition of the coating layers, may comprise the alumina-containing base layer region 50 so the above specific embodiments should not be restrictive of the scope of the claims. However, the one aspect of the alumina-containing base layer region is that the outermost coating layer is an alumina coating layer.

As will become apparent from the description hereinafter, the process to produce the post-blasted coating scheme includes a post-coating wet blasting step. Typically, the post-coating wet blasting step comprises pneumatically projecting alumina particles in a liquid (e.g., water) slurry to impinge all surfaces of the pre-blasted coating scheme. In this post-coating wet blasting step, wet blasting removes from all surfaces substantially all the titanium-containing outer coating layer region 54. In one alternative of the wet blasting step, substantially all of the alumina-containing base coating region remains. FIG. 3A shows the post-blasted coating scheme for this alternative. In another alternative of the wet blasting step, some the alumina-containing base coating region is removed through wet blasting. FIG. 3B shows the post-blasted coating scheme for this alternative.

One result of the wet blasting is the exposure of the underlying as-deposited outermost alumina coating layer of the alumina-containing base layer region to form the exposed alumina coating layer of the post-blasted coating scheme. The post-coating wet blasting step further reduces the tensile stress in the exposed alumina coating layer to a lower tensile stress or converts the tensile stress to compressive stress. The post-coating wet blasting step also smoothens the surface of the exposed alumina coating layer. It is clear that the wet blasting step both reduces the stress condition of the exposed alumina coating layer and smoothens the surface of the exposed alumina coating layer.

Figure 3A:
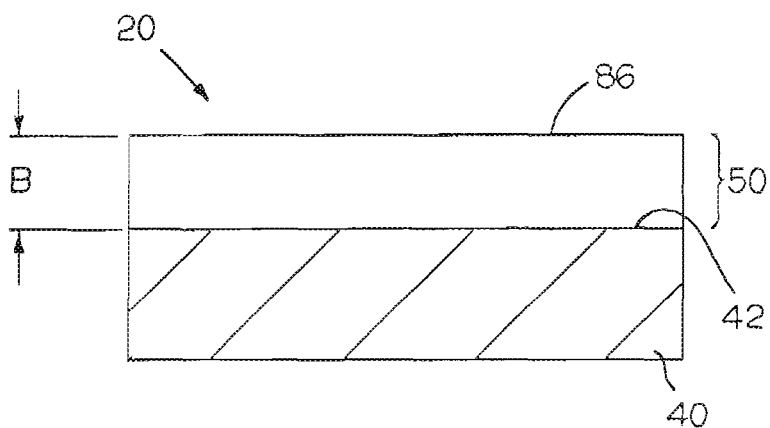
FIG. 3A is a cross-sectional view of a coated ceramic cutting insert like that of FIG. 1 showing the coated ceramic cutting insert in one alternative of a post-blasted condition wherein substantially all of the titanium-containing outer coating region has been removed and substantially all of the alumina-containing base coating region remains, i.e., has not been blasted off.

Referring to the first alternative as illustrated in FIG. 3A, the post-coating wet blasting step removes substantially all the titanium-containing outer coating layer region 54, but leaves substantially all of the alumina-containing base coating region 50, which has a surface 86. Thus, the thickness "B" of the alumina-containing base coating region 50 remains substantially unchanged. Thickness "B" of the alumina coating layer region 50 can range in one alternative between about 2 micrometers (μm) and about 25 micrometers (μm). Another alternative range of the thickness "B" comprises between about 2 micrometers (μm) and about 15 micrometers (μm). Still another alternative range of the thickness "B" comprises between about 4 micrometers (μm) and about 12 micrometers (μm).

Figure 3B:
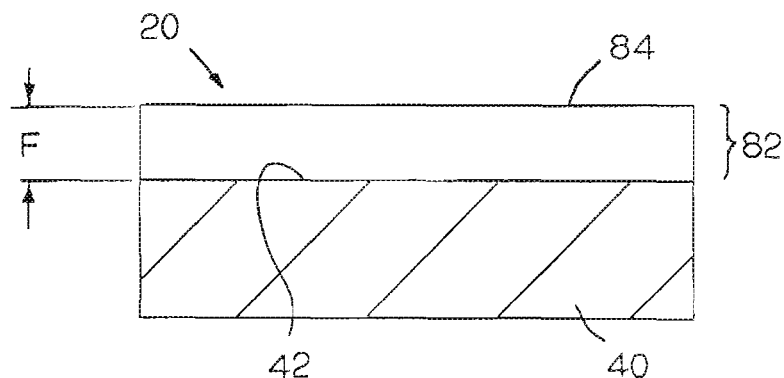
FIG. 3B is a cross-sectional view of a coated ceramic cutting insert like that of FIG. 1 showing the coated ceramic cutting insert in another alternative of a post-blasted condition wherein substantially all of the titanium-containing outer coating region has been removed and some of the alumina-containing base coating region has been removed by wet blasting.

Referring to the second alternative as illustrated in FIG. 3B, the post-coating wet blasting step removes all the titanium-containing outer coating layer region 54 and some of the alumina-containing base coating region 50. The thickness of the alumina-containing base coating region 50 reduces to form the alumina-containing base coating region 82, which has a surface 84. The alumina-containing base coating region 82 has a thickness "F". The magnitude of thickness "F" is less than the magnitude of thickness "B". Thickness "F" can range in one alternative between about 1 micrometers (μm) and about 23 micrometers (μm). Another alternative range of the thickness "F" comprises between about 1 micrometers (μm) and about 13 micrometers (μm). Still another alternative range of the thickness "F" comprises between about 2 micrometers (μm) and about 10 micrometers (μm).

The outermost alumina coating layer (as-deposited) has a tensile stress. The post-coating wet blasting step reduces the magnitude of the tensile stress from a pre-blasted tensile stress level to a post-blasted tensile stress level. The pre-blasted tensile stress level is greater than the post-blasted tensile stress level. The post-coating wet blasting step may also convert the tensile stress to compressive stress wherein this is a change from a pre-blasted tensile stress level to a post-blasted compressive stress level. This has the result of the exposed alumina coating layer exhibiting a reduced tensile stress, which has a value less than the tensile stress in the as-deposited outermost alumina coating layer, or exhibiting a compressive stress.

The post-coating wet blasting step also leads to smoothening of the exposed alumina coating layer. In one alternative, the exposed alumina coating layer exhibits a surface roughness $R_a$ of between about 0.2 μm and about 0.8 μm using a WYKO measurement technique. In another alternative, the exposed alumina coating layer exhibits a surface roughness $R_a$ of between about 0.2 μm and about 0.6 μm using a WYKO measurement technique. In still another alternative, the exposed alumina coating layer exhibits a surface roughness $R_a$ of between about 0.2 μm and about 0.5 μm using a WYKO measurement technique. In regard to the WYKO technique, a sampling area of 0.3 mm by 0.2 mm was chosen in WYKO measurement under the Vertical Scanning Interferometry mode.

In one alternative of the wear-resistant coating scheme, the as-deposited outermost alumina coating layer of the alumina-containing base layer region, which becomes the exposed alumina coating layer after wet blasting, exhibits a pre-blasted (or as-deposited) tensile stress condition equal to between about 50 MPa to about 800 MPa. After completion of the wet blasting, the exposed alumina coating layer has a stress condition of between 50 MPa (tensile stress) to about −2 GPa (compressive stress).

In another alternative of the wear-resistant coating scheme, the as-deposited outermost alumina coating layer of the alumina-containing base layer region, which becomes the exposed alumina coating layer after wet blasting, exhibits a pre-blasted (or as-deposited) tensile stress condition equal to between about 100 MPa to about 600 MPa. After completion of the wet blasting, the exposed alumina coating layer has a stress condition of between −50 MPa (compressive stress) to about −800 MPa (compressive stress).

In another alternative of the wear-resistant coating scheme, the as-deposited outermost alumina coating layer of the alumina-containing base layer region, which becomes the exposed alumina coating layer after wet blasting, exhibits a pre-blasted (or as-deposited) tensile stress condition equal to between about 100 MPa to about 450 MPa. After completion of the wet blasting, the exposed alumina coating layer has a stress condition of between −100 MPa (compressive stress) to about −400 MPa (compressive stress).

In reference to the measurement technique for the stress, the technique is x-ray diffraction (XRD) technique. The XRD stress measurement is based upon the Psi tilt method and the refection (024) of $Al_2O_3$ coating layer was chosen for measurement. Psi tilts of 0 degrees, 33.9 degrees, 52.1 degrees and 75 degrees were selected for the measurement of the residual stress levels. Positive and negative Psi tilts were chosen to supply the data required to determine possible shear stresses. Additionally, three Phi rotation angles were selected (0 degrees, 45 degrees, and 90 degrees) to provide the data required to determine the biaxial stress state of the material.

Biaxial stress calculations were completed using the following equation:

$$\frac{d_{\varphi\psi} - d_0}{d_0} = S_1(\sigma_1 + \sigma_2) + \frac{1}{2}S_2\sigma_\varphi\sin^2\psi$$

where:
$S_1$ and ½ $S_2$ are the x-ray elastic constants
$d_{\varphi\psi}$ measured peak d-spacing for the Psi tilt and Phi rotation
$d_0$ stress free peak d-spacing for diffracted reflection
$\sigma_1$ and $\sigma_2$ are the primary stresses $$\sigma_\varphi = \sigma_1 \cos^2\varphi + \sigma_2 \sin^2\varphi$$

The relationship of the various tilt and rotation angles in this method is shown in FIG. 5. Young's Modulus (E) is taken to be 401 GPa, Poisson's Ratio (v) is taken to be 0.22, and x-ray elastic constants ($S_1$ and $S_2$) are taken to be $-0.53 \times 10^6$ mm$^2$/N and $2.94 \times 10^6$ mm$^2$/N respectively for calculation of stress in $Al_2O_3$ coating.

The wet blasting is accomplished using a slurry comprising alumina particulates and water. The slurry of alumina particulates and water is pneumatically projected at the surface to impinge the surface of the substrate.

The fundamental parameters of the alumina-water slurry are grit (i.e., alumina particles) concentration in volume percent, and alumina particle size in micrometers (µm). In one alternative, the slurry comprises between about 5 volume percent and about 35 volume percent alumina particulates with the balance water. In another alternative, the slurry comprises between about 8 volume percent and about 25 volume percent alumina particulates with the balance water. In still another alternative, the slurry comprises between about 10 volume percent and about 20 volume percent alumina particulates with the balance water. For the particle size, in one alternative, the alumina particles can range in size between about 20 µm and about 100 µm. In another alternative, the alumina particles can range in size between about 35 µm and about 75 µm. In still another alternative, the alumina particles can range in size between about 45 µm and about 50 µm.

The operating parameters for the wet blasting step are pressure, angle of impingement, and duration. In this application, the angle of impingement is about ninety degrees, i.e., the particles impinge the surface at a ninety degree angle. In one alternative, the pressure ranges between about 35 pounds per square inch (psi) and about 55 psi. In another alternative, the pressure ranges between about 40 pounds per square inch (psi) and about 50 psi. The duration of the wet blasting varies with the specific wet blasting operation wherein the goal is to achieve complete (or substantially complete) removal of the titanium containing outer coating layer region. Exemplary durations comprise between about 6 seconds and about 45 seconds. One range of duration is between about 9 seconds and about 30 seconds. Still another range of duration is between about 12 seconds and about 21 seconds.

In reference to a method of making a coated ceramic cutting insert, the basic steps comprise the following steps.

The first step comprises providing a ceramic substrate wherein the ceramic substrate is selected from the group consisting of silicon nitride-based ceramics and silicon aluminum oxynitride-based ceramics. The typical technique to form the ceramic substrate comprises consolidation of a powder mixture. The consolidation typically occurs under pressure and/or heat. The ceramic substrate has a rake surface and at least one flank surface. A cutting edge is at the juncture between the rake surface and the flank surface. The ceramic substrate is then subjected to a mechanical polish as the pre-coat treatment to smoothen the substrate surface for preparation of the coating.

The next objective in the process is to form a pre-blasted coated ceramic member, which comprises the ceramic substrate and a pre-blasted coating scheme. Two basic steps are used to achieve this objective. The first of these three steps is depositing on the surface of the ceramic substrate the alumina-containing base coating layer region, which comprises at least one outermost alumina coating layer. The second of these steps is depositing on the alumina-containing base coating layer region by chemical vapor deposition a titanium-containing outer coating layer region.

The objective of the next step is to change the pre-blasted coated ceramic member to a (post-blasted) coated ceramic cutting insert that comprises a ceramic substrate with a post-blasted coating scheme thereon. This step comprises wet blasting off the titanium-containing outer coating layer region (and possibly some of the alumina coating) thereby exposing the outermost alumina coating layer and changing the stress condition of the exposed outermost alumina coating layer, as well as smoothening the exposed alumina coating layer.

Specific examples of the inventive coated ceramic cutting insert and the comparative testing thereof are set forth below. One comparative test measured the tool life in minutes of an inventive coated ceramic cutting insert against the tool life in minutes of a coated ceramic cutting insert not subjected to wet blasting. The other comparative test measured the percentage of edge line chipping of an inventive coated ceramic cutting insert against the tool life in minutes of a coated ceramic cutting insert not subjected to wet blasting.

Table 1 sets out the basic process parameters used to deposit the alumina-containing base coating region and the titanium-containing outer coating region for the specific examples of the inventive ceramic cutting insert. In this regard, the process of parameters in Table 1 represents the steps used to apply a coating scheme to the surface of the ceramic substrate.

TABLE 1

Process Parameters for Invented coating process

| Materials | Temperature (° C.) | Pressure (mbar) | Total Time (minutes) | Gases Present |
|---|---|---|---|---|
| Purging | 1000 | 90 | 30 | $H_2 + N_2 + AlCl_3$ |
| Bonding layer | 970-1000 | 60 | 25 | $H_2 + AlCl_3 + CO_2 + HCl$ |
| $Al_2O_3$ | 970-1000 | 60 | 100-900 | $H_2 + AlCl_3 + CO_2 + HCl + H_2S$ |
| TiCN | 970-1000 | 60 | 50 | $H_2 + N_2 + CH_4 + TiCl_4 + HCl$ |
| TiN | 970-1000 | 60 | 50 | $H_2 + N_2 + TiCl_4 + HCl$ |

The above steps occur in sequence beginning with the purging step through the step to apply the TiN.

In reference to the above steps in Table 1, the purpose of the purging step was to set up the reactor for the deposition of the bonding layer. In the actual examples, the next step was the deposition of the bonding layer on the surface of the ceramic substrate. The bonding layer is so thin that it is microscopically undetectable. At least for the purpose of this description, and one can consider the bonding layer to be a part of the alumina coating layer. The composition of the bonding layer is alumina. The next step is the deposition of the alumina coating layer. In the specific examples, the alumina coating has a thickness equal to about 11 μm so that due to the thinness of the bonding layer, the thickness of the combination of the bonding layer and the alumina layer is about 11 μm. As one alternative, the thickness of the alumina (and bonding) coating layer is between about 2 μm and about 25 μm. In another alternative range, the thickness of the alumina (and bonding) coating layer is between about 2 μm and about 15 μm. In still another alternative range, the thickness of the alumina (and bonding) coating layer is between about 4 μm and about 12 μm.

The next step is the deposition of the titanium carbonitride coating layer and then the deposition of the titanium nitride coating layer. In the specific examples, the total thickness of the titanium carbonitride coating layer and the titanium nitride coating layer is about 1 μm. As one alternative, the thickness of the titanium carbonitride coating layer and the titanium nitride coating layer is between about 0.5 μm and about 5 μm. In another alternative range, the thickness of the titanium carbonitride coating layer and the titanium nitride coating layer is between about 0.5 μm and about 3 μm. In still another alternative range, the thickness of the titanium carbonitride coating layer and the titanium nitride coating layer is between about 0.5 μm and about 1.5 μm. The combination of the titanium carbonitride coating layer and then the deposition of the titanium nitride coating layer correlates to the titanium-containing outer coating region.

The prior art used in the comparative testing had a coating scheme that comprised $Al_2O_3$/TiCN alternating coating layers. The thickness of each $Al_2O_3$ coating layer was equal to 1.5 μm and the thickness of each TiCN coating layer was equal to 0.5 μm. The thickness of the coating scheme was equal to 4.0 μm without any further processing after coating. The inventive ceramic cutting insert used in the comparative testing comprised the prior art coated ceramic cutting insert subjected to a wet blasting procedure wherein the wet glass screen removed the titanium-containing outer coating region. This wet blasting procedure is set forth in Table 2 below.

TABLE 2

Post-Coating Blasting Parameters

| Parameter | Description |
|---|---|
| Composition of the alumina particle-water slurry | In the range of 5%-35% by volume |
| Size of the alumina particles | In the range of 20 μm-100 μm |
| Pressure during the impingement process | In the range of 35 psi-55 psi |
| Duration of the Impingement | In the range of 6 seconds to 45 seconds |

For both the prior art coated ceramic cutting insert and the inventive coated ceramic cutting insert, the cutting insert style was the ANSI Standard SNGA433T0820. The parameters of the specific coated ceramic cutting inserts used in the comparative tests are set forth in Table 3 below.

TABLE 3

Specific Parameters for the Coated Ceramic Cutting Insert

| Parameter | Description/Details of Prior Art Coated Ceramic Cutting Insert | Description/Details of Inventive Coated Ceramic Cutting Insert |
|---|---|---|
| Geometry | ANSI Standard SNGA433T0820 | ANSI Standard SNGA433T0820 |
| substrate composition | 98% by weight of beta-silicon nitride with the balance of metallic phase. | 98% by weight of beta-silicon nitride with the balance of metallic phase. |
| alumina-containing base coating layer region | $Al_2O_3$/TiCN alternating layers with 1.5 um thickness for $Al_2O_3$ and 0.5 um thickness for TiCN layer and a 4 μm total thickness | $Al_2O_3$ monolayer with a compressive stress of 257 MPa on the rake face and 262 MPa on the flank face; 10 μm thickness |
| titanium-containing outer coating region | TiCN/TiN with 1 um thickness | None |

TABLE 3-continued

Specific Parameters for the Coated Ceramic Cutting Insert

| Parameter | Description/Details of Prior Art Coated Ceramic Cutting Insert | Description/Details of Inventive Coated Ceramic Cutting Insert |
|---|---|---|
| Postcoat surface treatment | None | Wetblasting with the following parameters: Composition of the alumina particle-water slurry: 20%; size of the alumina particles: 25-50 μm, pressure during the impingement: 35-40 psi; duration of the Impingement: 9 seconds |

For the comparative testing measuring tool life, the parameters were as follows: workpiece material: Class 30 gray cast iron tube (clean OD); speed equal to 2000 surface feet per minute (sfm) (610 surface meters per minute); a feed rate equal to 0.012 inch (0.3 millimeters) per revolution (ipr); a depth of cut (doc) equal to 0.060 inch (1.52 millimeters); a lead angle equal to 15 degrees; and coolant: dry. The failure criteria were: UNF equal to 0.012 inches (0.3 millimeters) maximum; nose wear (NW) equal to 0.012 inches (0.3 millimeters); depth of cut notching (DOCN) equal to 0.012 inches (0.3 millimeters); CR equal to 0.004 inches (0.1 millimeters); and TW equal to 0.012 inches (0.3 millimeters).

In the comparative testing, six samples, i.e., three prior art coated ceramic cutting inserts and three inventive coated ceramic cutting inserts, were run. The results of the comparative testing are set forth in Table 4 below.

TABLE 4

Tool Life Results from Comparative Testing

| Repetition | Tool Life (Minutes)/Failure Mode |
|---|---|
| Prior Art - 1 | 2.9/NW |
| Prior Art - 2 | 9.6/NW |
| Prior Art - 3 | 5.5/NW |
| Invention - 1 | 12.9/NW |
| Invention - 2 | 14.8/NW |
| Invention - 3 | 14.3/NW |

These results show an average of 130% improvement in the life time (tool life) of the inventive cutting inserts in the wear resistance as compared to the wear resistance of the prior art cutting insert.

For the comparative testing measuring edge line chipping, a wet turning cycle interrupted cut operation was used with the following parameters: workpiece materials: 80-55-06 ductile iron; speed equal to 1200 surface feet per minute (sfm) (366 surface meters per minute); a feed rate equal to 0.008 inch (0.2 millimeters) per revolution, and a depth of cut equal to 0.08 inch (2 millimeters); and a lead angle equal to −5 degrees. The prior art coated ceramic cutting insert and the inventive coated ceramic cutting insert were examined for edge line chipping after 36 passes. Table 5 below sets forth results of a comparison of the edge line chipping of the prior art coated ceramic cutting insert and the inventive coated ceramic cutting insert. The measurement of the edge line chipping was done using an optical microscope under a 30× magnification.

TABLE 5

Comparison of Prior Art Cutting Inserts and Inventive Cutting Inserts

| Test candidates | Percentage of edge line chipping |
|---|---|
| Prior Art Insert | 87% |
| Sample 1 - Inventive Insert | 25% |

The inventive cutting inserts exhibited reduced edge line chipping compared to the prior art insert.

An analysis of the comparative test results in Tables 4 and 5 show that the inventive cutting inserts exhibited enhanced wear resistance, as well as improved toughness, which is indicated by the increase in resistance to edge line chipping (i.e., less percentage of edge line chipping) as compared with the prior art cutting inserts.

The patents and other documents identified herein are hereby incorporated in their entirety by reference herein. Other embodiments of the invention will be apparent to those skilled in the art from a consideration of the specification or a practice of the invention disclosed herein. There is the intention that the specification and examples are illustrative only and are not intended to be limiting on the scope of the invention. The following claims indicate the true scope and spirit of the invention.

What is claimed:

1. A method of making a coated ceramic cutting insert comprising the steps of:

providing a ceramic substrate wherein the ceramic substrate is selected from the group consisting of silicon nitride-based ceramics and silicon aluminum oxynitride-based ceramics, the ceramic substrate having a rake surface and at least one flank surface, and a cutting edge formed at the juncture between the rake surface and the flank surface;

forming a pre-blast coated member comprising the ceramic substrate and a pre-blasted coating scheme, and wherein the pre-blasted coating scheme is deposited by the following steps:

depositing on the surface of the ceramic substrate by chemical vapor deposition an alumina-containing base coating layer region, and the alumina-containing base coating layer region comprising at least one outermost alumina coating layer;

depositing on the alumina-containing base coating layer region by chemical vapor deposition a titanium-containing outer coating layer region comprising at least one titanium-based coating layer; and wet blasting off the titanium-containing outer coating layer region thereby exposing the outermost alumina coating layer to form an exposed alumina coating layer and changing the stress condition of the exposed outermost alumina coating layer from an initial stress condition ranging between about 50 MPa (tensile stress) and about 800 MPa (tensile stress) as measured by as measured by XRD using the Psi tilt method and the (024) reflection of alumina to a blasted stress condition ranging between about 50 MPa (tensile stress) and about −2 GPa (compressive stress) as measured by XRD using the Psi tilt method and the (024) reflection of alumina.

2. The method according to claim 1 wherein the alumina-containing base layer region consists essentially of the outermost alumina coating layer.

3. The method according to claim 1 wherein the alumina-containing base layer region consists essentially of a plurality of coating sets and the outermost alumina coating layer, and each coating set comprises an alumina coating layer and a titanium oxycarbonitride coating layer.

4. The method according to claim 1 wherein the exposed alumina coating layer comprises alpha-alumina.

5. The method according to claim 1 wherein the wet blasting uses a slurry comprising alumina particulates and water, and wherein the slurry comprises between about 5 volume percent and about 35 volume percent alumina particulates and between about 65 volume percent and about 95 volume percent water as measured by slurry sampling and volumetric displacement.

6. The method according to claim 1 wherein the exposed alumina coating layer exhibits a surface roughness $R_a$ between about 0.2 micrometers and about 0.8 micrometers.

7. The method according to claim 1 wherein the wet blasting step removes only the titanium-containing outer coating layer region thereby leaving substantially all of the alumina-containing base coating layer region.

8. The method according to claim 1 wherein the wet blasting step removes the titanium-containing outer coating layer region along with some of the alumina-containing base coating layer region.

* * * * *

UNITED STATES PATENT AND TRADEMARK OFFICE
CERTIFICATE OF CORRECTION

| | | |
|---|---|---|
| PATENT NO. | : 8,865,260 B2 | Page 1 of 1 |
| APPLICATION NO. | : 13/908085 | |
| DATED | : October 21, 2014 | |
| INVENTOR(S) | : Zhigang Ban et al. | |

It is certified that error appears in the above-identified patent and that said Letters Patent is hereby corrected as shown below:

On the Title Page, in Column 1, below "Related U.S. Application Data", delete Item "(60)" and insert Item -- (62) --, therefor.

Signed and Sealed this
Seventh Day of April, 2015

Michelle K. Lee
*Director of the United States Patent and Trademark Office*